United States Patent [19]

Gaidis et al.

[11] Patent Number: 4,460,720
[45] Date of Patent: Jul. 17, 1984

[54] MULTICOMPONENT CONCRETE SUPERPLASTICIZER

[75] Inventors: James M. Gaidis, Ellicott City; Arnold M. Rosenberg, Potomac, both of Md.

[73] Assignee: W. R. Grace & Co., New York, N.Y.

[21] Appl. No.: 349,555

[22] Filed: Feb. 17, 1982

[51] Int. Cl.$^3$ .............................................. C08K 3/34
[52] U.S. Cl. ........................................ 524/5; 524/72; 524/158
[58] Field of Search ............... 524/5, 72, 158; 106/90, 106/92

[56] References Cited

U.S. PATENT DOCUMENTS 3,053,673 9/1962 Walker .................................. 106/90
3,619,221 11/1971 Kossivas ............................... 106/90
4,131,578 12/1978 Crinkelmeyer .................... 260/17.5

FOREIGN PATENT DOCUMENTS 0002771 12/1978 European Pat. Off. .
53-75947 11/1978 Japan .
53-75948 11/1978 Japan .
1255964 12/1971 United Kingdom .

OTHER PUBLICATIONS

Superplasticizers in Concrete by Preiss and Sasse, Ed. by Malhotra et al., vol. II pp. 733–750.
"Influence of Water–Reducing Admixtures on Properties of Cement Pastes–A Minislump Test", Cement, Concrete and Aggregates, vol. 2, No. 2, Winter 1980, pp. 95–102.

Primary Examiner—Paul R. Michl
Attorney, Agent, or Firm—Howard J. Troffkin; William W. McDowell, Jr.

[57] ABSTRACT

A superplasticizer cement admixture for portland cement based compositions formed from a low molecular weight alkali metal polyacrylate in combination with an alkali metal or alkaline earth metal polynaphthalene sulfonate-formaldehyde or an alkali metal lignosulfonate or an alkaline earth metal lignosulfonate or mixtures thereof.

16 Claims, 3 Drawing Figures

FIG. 1

FIG. 2

MULTICOMPONENT CONCRETE SUPERPLASTICIZER

BACKGROUND OF THE INVENTION

The present invention is directed to a cement admixture capable of greatly increasing the fluidity or slump characteristictics of portland cement compositions and of retaining the increased fluidity over extended periods of time. These desired properties are achieved without over retarding the set characteristics of the cement composition.

Commonly known classes of cements, such as portland cements, high-alumina cements and gypsum plaster, are categorized according to their chemical composition and application. For example, Portland cements have high silicate content and are used in structural applications. Alumina cements contain constituents high in alumina content and are used in specialized applications as a refractory cement. Gypsum plaster or plaster of Paris consists essentially of calcium sulfate hemihydrate and is often used in forming interior walls or for taking impressions of objects. Because of their chemical and application differences, the materials are treated as distinct materials by those skilled in the art. The present invention relates to compositions useful in modifying the properties of portland or high silicate content cements.

Portland cement compositions are brought into a workable form by mixing the solid components with an amount of water which is greater than that required to hydrate the cement components therein. The mixed mineral binder composition is poured into a form and allowed to harden at atmospheric temperature. During the hardening, some of the excess water remains, leaving cavities in the formed structural unit and, thus, reduces the mechanical strength of the resultant unit. It is well known that the compressive strength of the resultant structure generally bear an inverse relationship to the water-cement ratio of the starting mix. The desire to use smaller quantities of water is limited by the required flow and workability properties of the fresh mixture.

It is desired in many applications to use unset cement compositions which are of low viscosity or even self-leveling which, at the same time, are capable of forming a set cement of high compressive strength (via low water-cement ratio). In structural cement compositions, for example, it is highly desirable to maintain very low water content in order to achieve high strength in the final product. On the other hand, it is desirable that the unset composition have fluid properties to enhance mixing to cause uniform distribution of the liquid (water) in the solid components, pumpability to permit the unset cement composition to be carried to the needed structural site and flowability to permit the unset cement composition to be readily shaped into the desired form.

Cement admixtures (The term "admixture" as used herein and in the appended claims is a term of art referring to compounds and compositions added to cement mixtures or compositions to alter their properties. The term does not imply that the components of an admixture do or do not interact to cause the desired result.) capable of causing the above-described viscosity reducing characteristics are known. These materials are generally categorized as "water-reducing agents" if they are capable of modifying viscosity to a limited degree or as "high range water-reducing agents" or "superplasticizers" if they have the ability to permit large water cuts in the cement mixture while maintaining fluidity or cause large increases in fluidity at constant water content. Lignin sulfonates and polysaccharides are known water reducing agents while sulfite modified condensation products of melamine-formaldehyde or sulfonate modified condensation products of naphthalene-formaldehyde are commercially available superplasticizers. While these admixtures have the advantage of increasing initial fluidity, they also have the disadvantage of increasing the rate at which the cement composition loses its fluidity or slump. H. P. Preiss and H. R. Sasse, in *Superplasticizers in Concrete*, Vol. II, Ed. by V. M. Malhotra et al, pages 733–750, compare the effects of various known water-reducing agents and superplasticizers including sulfonated melamine-formaldehyde condensates, sulfonated naphthalene-formaldehyde condensates, lignin-sulfonates and polystyrene sulfonates. The study concludes that very high dosages of any of the studied admixtures are needed to appreciably increase the flow of cement compositions yet, such dosages enhance the rate of slump loss and tend to retard or prevent set.

Polyacrylates, normally of high molecular weight, have been considered a poor candidate as a superplasticizer as they have been found to cause flocculation of cement slurries.

It is highly desired to have superplasticizer admixture compositions which can impart a high degree of fluidity to cement compositions, can cause retention of the fluidity over extended time and can achieve these results at low dosages and without adverse effect of set retardation.

SUMMARY OF THE INVENTION

The present invention is directed to a superplasticizer cement admixture composition capable of providing a high degree of fluidity to cement compositions. The subject admixtures are further capable of providing extended time of fluidity and workability to the cement compositions. The desired properties of fluidity and extended workability time are obtained without causing substantial set retardation of the cement composition.

The cement admixture composition of the present invention is a mixture of low weight average molecular weight alkali metal polyacrylate in combination with an alkali metal sulfonated naphthalene-formaldehyde condensate or an alkali or alkaline earth metal lignosulfonate or a mixture of the three classes of components.

DETAILED DESCRIPTION OF THE INVENTION

It has been presently found that an unexpectedly high degree of fluidity and extended workability time of unset cement compositions can be achieved by having the compositions contain small dosages of the cement superplasticizer admixture of the present invention.

Cement compositions capable of being modified by the subject admixture are conventional cement-based compositions formed by mixing standardized amounts of required components, i.e. a portland cement, water, sand and aggregate, as is applicable for the particular material being formed.

The cement compositions in which the present admixture has been found useful include cement pastes, that is, mixtures composed of a portland cement and water; mortars composed of portland cement, water and sand in standard amounts; and concrete compositions composed of portland cement, water, sand, and aggregate, each in standard amounts and size. The present invention is particularly useful in concretes used to form structural units. In each of the above-described cement compositions, it is desirable to have low water to cement ratios, such as from 0.2 to 0.6, in order to form a set composition of suitable strength. The amount of water present is inversely proportional to the strength of the set cement composition and, therefore, lowering the ratio is desirable.

The term "cement composition" as used in the present disclosure and appended claims refers to pastes, mortars and concrete compositions, as described above formed with a portland or high silicate content cement. These cements are conventionally known and are manufactured by calcining a mixture of limestone and clay to form a clinker, and by grinding the clinker to a fine powder. The major compounds found in portland cement are tricalcium silicate, dicalcium silicate, tricalcium aluminate, and tetracalcium aluminoferrite. The tricalcium and dicalcium silicates are thought to be the principal bonding constituents in the portland cement. Tricalcium silicate, when mixed with water, forms a calcium silicate hydrate known as tobermorite gel and calcium hydroxide. The dicalcium silicate, when contacted with water, forms similar products, but at a much slower rate of reaction. The tricalcium silicate, having the greater rate of reaction, determines to a large extent the rate of set of the cement. To provide materials which are suitable for different uses, portland cements having a range of properties have been made commercially available. Four general types of portland cements, varying principally in the relative quantities of tricalcium silicate and dicalcium silicate present therein, are commonly produced. The proportions of the principal compounds present in three of these cements are tabulated hereinbelow.

| Portland Cement Type | I | II | III |
|---|---|---|---|
| Composition, wt. percent: | | | |
| Tricalcium silicate | 53 | 47 | 58 |
| Dicalcium silicate | 24 | 32 | 16 |
| Tricalcium aluminate | 8 | 3 | 8 |
| Tetracalcium aluminoferrite | 8 | 12 | 8 |

The water to cement ratio of a particular composition will determine, to a large extent, the strength of the resultant set material. As discussed above, the amount of water required to form a uniform composition is in excess of that needed to react with the cement components. Reduction of the water to cement ratio while maintaining or increasing the fluidity of the mixture is highly desired. When using the presently described admixture, one has greater capability of forming a uniform mixture, of molding the cement composition into desired shapes, of causing the composition to be substantially self-leveling and of causing the cured cement composition to exhibit higher compressive strength than normally attainable for the same amount of cement. One further gains an extended workability time without proportionally extending the set time of the resultant cement composition.

"Fluidity," "slump" and "workability" are interrelated terms. Slump is a term of art relating to a standard test for determining the ease of movement of an unset cement composition. The slump test measures the amount of settlement or flow a shaped cement charge has once under unsupported conditions. A cement composition is workable, i.e. moldable, shapable, etc. while the cement exhibits some degree of slump or flow characteristics.

Figure 1:
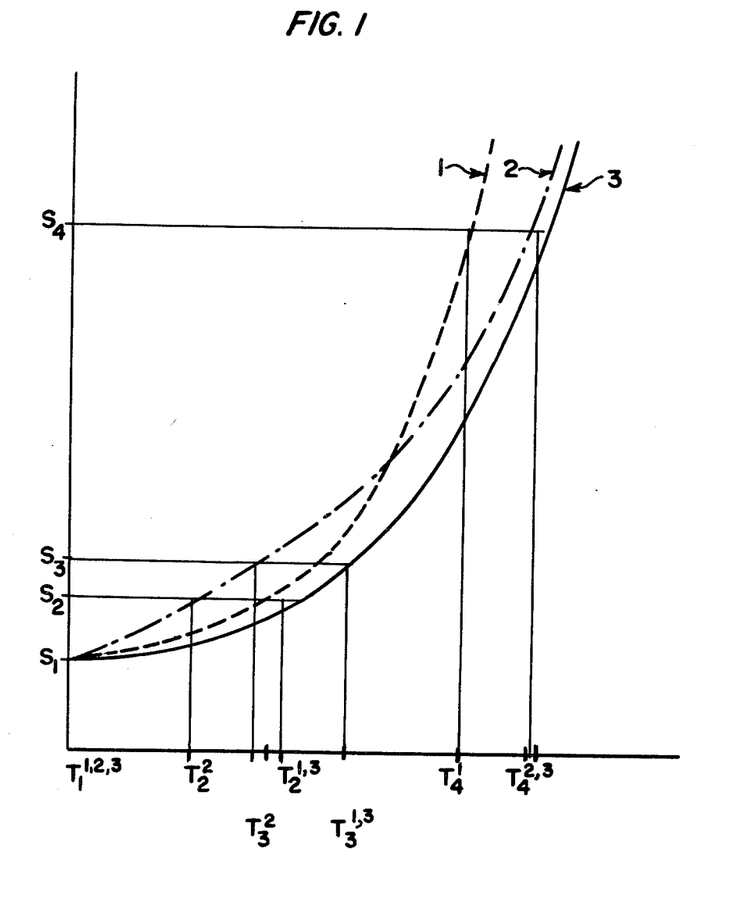

Referring to FIG. 1 which graphically depicts the relationship of the strength of cement compositions with respect to time subsequent to initial formation (inclusion of water). The initial stiffness or strength for a particular solid component cement mixture is determined by the water to cement ratio and, where appropriate, the presence of a water-reducing or superplasticizer cement admixture. The initial strength $S_1$ of a cement composition may be, for example, such that the slump is from about 6 to 10 inches. The strength increases with time causing a corresponding decrease in fluidity or slump until it reaches a strength $S_2$ at time $T_2$ where it exhibits substantially no fluidity (slump of less than 2 inches) and is therefore no longer movable. The cement composition must be placed in its desired position before it attains strength $S_2$. At a time $T_3$ the cement reaches a strength $S_3$ where it can sustain a weight (such as a man walking on it) but can be trowelled and finished. Strength $S_3$ has low penetration test values (ASTM C-403) of about 500 psi. The cement composition reaches a strength $S_4$ at $T_4$ at which point it has a high penetration test value of about 4,000 psi and no further work can be done to productively alter its form.

FIG. 1 contains three curves showing the relationship of strength to time for cement compositions formed from a particular mixture of solids (cement, sand, aggregate) with water and no admixture (Composition 1 represented by curve 1); with a substantial reduction in water content and with a conventional superplasticizer (Composition 2 represented by curve 2); and with the same substantial reduction in water content as Composition 2 and with an equivalent amount of a superplasticizer of the present invention (Composition 3 represented by curve 3).

At time $T_1$ each of the compositions 1, 2 and 3 (the composition referenced is superscripted) has the same strength, $S_1$. Compositions 2 and 3 are formed with a lower water to cement ratio which will enable them to form final products having greater strength characteristics than composition 1 which has more water to provide the same initial slump or fluidity. Composition 2 which contains a conventional superplasticizer loses fluidity (gains strength) more rapidly than composition 1 and thereby reaches strength $S_2$ at a time $T_2^2$ which is significantly less than the time $T_2^1$ required for composition 1 to reach strength $S_2$. Thus, composition 2 containing a conventional superplasticizer has less fluidity and workability than composition 1 over times from $T_1$ to $T_2$. The gain in water reduction achieved in composition 2 is countered by the detrimental effect of acceleration in loss of workability. A further comparison of cement composition 2 containing a conventional superplasticizer with cement composition 1 shows that the set strength $S_4$ is slightly retarded for composition 2, i.e. $T_4^2$ is slightly greater than $T_4^1$. This allows for slight increase in available finishing time. While addition of a conventional superplasticizer permits decrease in water-cement ratio it causes the disadvantage of early slump loss and therefore early loss of workability time for the treated cement composition.

Curve 3 of FIG. 1 illustrates the strength-time relationship of cement compositions formed with the superplasticizer of the instant invention. Composition 3 can have an initial strength $S_1$ with the use of a substantial reduction in water content in the same manner as attainable with conventional superplasticizers. The slump loss or loss of workability is significantly slower than that of composition 2. Time $T_2^3$ is significantly longer than time $T_2^2$ and it may be equal to or even greater than that of the composition 1. This increase in working time and fluidity is attained without any detrimental amount of retardation in time $T_4^3$ to reach set strength $S_4$.

Small amounts of the superplasticizer composition of the present invention can significantly increase slump or fluidity of a cement composition having a particular water to cement ratio over the same compositions having no superplasticizer or, alternately, can permit substantial reduction in water to cement ratio without loss to fluidity. Further, the present superplasticizer composition imparts greater fluidity over an extended period of time in comparison to conventional superplasticizer admixtures. Finally, cement compositions containing the present superplasticizer compositions attain set strength $S_4$ within suitable time.

It has been presently unexpectedly found that a superplasticizer cement admixture can be formed which imparts the desired properties of increased fluidity at low dosages and retention of fluidity over extended period of time without substantially increasing the set time of the cement composition.

The subject superplasticizer cement admixture is formed from an alkali metal polyacrylate in combination with an alkali metal naphthalene sulfonate-formaldehyde condensate or an alkali or alkaline earth lignin sulfonate or mixtures thereof, as fully described hereinbelow.

The term "polyacrylic acid", as used in the present disclosure and appended claims, shall mean homopolymers and copolymers of acrylic acid and/or methacrylic acid in which the carboxylic acid groups have not been converted into metal salts. The terms "polyacrylate" or "alkali metal polyacrylate", as used in the present disclosure and appended claims shall refer to homopolymers and copolymers of acrylic acid and/or methacrylic acid in which at least a portion of the carboxylic acid groups therein are in the form of alkali metal salts. The polyacrylic acids and, therefore, the polyacrylates useful in the present invention may also contain small amounts of up to about 30 percent and preferably up to about 20 percent by weight of comonomeric units of $C_1$-$C_3$ alkyl esters or amides of acrylic or methacrylic acid.

The alkali metal polyacrylates suitable for use as a component of the present superplasticizer admixture is formed from a polymer of acrylic acid or methacrylic acid or mixture thereof, preferably from acrylic acid. The amount of any ester or amide comonomer present in the polyacrylate must be less than an amount causing the polymer to be insoluble in water. The polyacrylic acid used to form the polyacrylate should have a low weight average molecular weight of from 500 to 25,000, preferably from 1,000 to 10,000. The polyacrylate component of the present superplasticizer can be represented by the general formula:

wherein each R is individually selected from hydrogen or methyl; $R^1$ is selected from a $C_1$-$C_3$ alkoxy or $NH_2$; M is an alkali metal, preferably sodium; x, y and z are integers such that z is from 0 to less than 0.3 of the total of $x+y+z$; and $x+y+z$ is a sum of the integers to represent a low molecular weight polymer of from about 500 to 25,000, preferably from 1,000 to 10,000.

The low molecular weight polyacrylic acid component can be formed by conventional techniques known to those skilled in the art such as by solution polymerization in which free radical polymerization of the monomer or monomers is conducted in isopropanol or isopropanol-water solvent at 120° to 200° C. under pressure as disclosed in German patent application No. 2,757,329 filed Dec. 22, 1977. The free carboxylic acid groups of the polyacrylic acid is formed into an alkali metal salt with an alkali metal hydroxide or the like in sufficient amount to cause a resultant aqueous solution of the polymer to have a pH of from at least about 6 to about 10 and preferably from about 7 to 8.

The alkali metal and alkaline earth metal naphthalene sulfonate-formaldehyde condensation products suitable for use in the present superplasticizer cement admixture are commercially available products. These products are conventionally formed by reacting formaldehyde with naphthalene sulfonic acid in ratios ranging from about 0.75 to about 1.35 at temperatures of from about 90° C. to 120° C. When the ratio is in the order of 0.75 the reaction time is short i.e. about 4-6 hours while when the ratio is high the reaction time is longer i.e. about 8-12 hours. The molecular weight of the condensation product can be from about 1,000 to about 200,000. The molecular weight is dependent on the ratio of reactants, the reaction time and the reaction temperature as is well known to those skilled in the art. The resultant condensation product is formed into the metal salt by reacting the product with an alkali metal or alkaline earth metal hydroxide or its equivalent, the metal is preferably sodium or calcium, in sufficient amount to form an aqueous solution of the product having a pH of from about 7 to 10.

The lignin sulfonate component of the present superplasticizer cement admixture is a commercially available product and has been considered useful as a water-reducing agent for cement compositions. The lignin is normally obtained as a by-product from pulp making processes in which wood chips are cooked under pressure in a sulfurous acid solution. The resultant alkali metal and alkaline earth metal lignin sulfonates are formed by neutralization of the cooking liquor and, when desired, the metal can be exchanged by the addition of sulfates of other metal cations. For example, sodium lignin sulfonate is normally formed by precipitation of calcium lignin sulfonate with sodium sulfate. Calcium and sodium salts are the preferred lignin sulfonates in the subject superplasticizer.

The present cement superplasticizer admixture is required to be composed of an alkali metal polyacrylate, in combination with an alkali metal naphthalene sulfonate-formaldehyde condensate or an alkali metal or an alkaline earth metal lignin sulfonate or mixtures thereof. The polyacrylic acid metal salt must be present in from at least 5 percent to 95 percent and preferably from 15 to 85 percent and most preferably from 20 to 85 percent by weight of the total combination.

The superplasticizer can be in the form of a composition having from about 5 percent to 95 percent by weight of an alkali metal polyacrylate with the remaining 95 to 5 percent by weight composed of an alkali metal naphthalene sulfonate-formaldehyde condensate. Alternately, the subject superplasticizer can be composed of from 5 to 95 percent by weight of an alkali metal (preferably sodium) polyacrylate with the remainder comprising an alkali or alkaline earth metal (preferably sodium or calcium or mixtures) lignin sulfonate. Exceptionally good superplasticizers are formed from two component compositions containing from 20 to 85 percent by weight polyacrylate.

The most preferred superplasticizer cement admixtures of the present invention are formed from a combination containing all three components described above, i.e. an acrylate, a naphthalene-sulfonate and a lignin. The combination should contain from 5 to 95, preferably from 15 to 85 and most preferably from 20 to 85 weight percent of the polyacrylate described above. The preferred superplasticizer is further composed of an alkali metal naphthalene sulfonate-formaldehyde and an alkali or alkaline earth metal lignin sulfonate in weight ratio of from 0.1:99.9 to 99.9:0.1, preferably from 90:10 to 10:90. The most preferred superplasticizer admixtures would be composed of at least about 15 percent by weight alkali metal polyacrylate, at least about 10 percent by weight of a naphthalene sulfonate-formaldehyde and at least about 10 percent by weight of a lignin sulfonate based on the total weight of solids of the admixture.

The amount of the present superplasticizer cement admixture required in a cement composition should be an effective amount to substantially reduce the water content (by about 10 percent or greater) while retaining equivalent slump of a blank cement composition or an effective amount to increase the slump while maintaining the water to cement ratio, whichever is desired. It has been unexpectedly found that the combinations of components used in the proportions described hereinabove achieve greater amount of slump than is expected additively from each component. The specific amount of the present superplasticizer cement admixture can be readily determined and will depend upon the cement composition and the ratio of components of the composition. Generally the amount will range from about 0.05 to 2, preferably 0.15 to 0.5 weight percent of total solids of the cement composition. Greater amounts may be used but generally are unnecessary to achieve the desired results.

The superplasticizer cement admixture of the present invention can be added to cement compositions in any conventional manner. For example, the components can be added to the cement compositions substantially simultaneously such as by previously mixing the components, either in a dry state or as an aqueous solution and adding the formed composition to the cement composition. It is preferred that the present superplasticizer be introduced into a cement composition as aqueous solution either simultaneously with, as part of or subsequent to the addition of water used to form the wet cement compositions such as just prior to utilization of the cement composition. The subject superplasticizer cement admixture should be substantially uniformly mixed with the cement composition to permit interaction between the present admixture and the hydraulic cement of the cement composition as well as interaction of the admixture components (the exact nature of the interaction is unknown and not meant to be a limitation on the present invention) causing unexpected increased initial fluidity and retention of fluidity over time.

The cement composition may contain other conventional cement admixtures added in amounts and in manners known in the art. For example, the cement composition containing the superplasticizer described herein may also contain air entraining agents such as resin soaps, alkyl benzene sulfonates and the like or retarders such as gluconates, sugars and the like as well as other admixtures.

The resultant cement structure, although formed from a wet cement composition exhibiting great fluidity and extended time of fluidity, is a structure of increased strength. This is especially important and desirable when the cement structure is a structural concrete formation.

The following examples are given for illustrative purposes only and are not meant to be a limitation on the subject invention except as defined in the claims appended hereto. All parts and percentages are by weight unless otherwise indicated.

EXAMPLE I

A. A series of cement compositions in the form of cement pastes were formed from a commercially available Type II portland cement and water in a water to cement ratio of 0.45. Each of the samples was mixed with varying amounts of a commercially available sodium naphthalene sulfonate-formaldehyde condensation product (DAXAD-19 of W. R. Grace and Co.) or varying amounts of sodium polyacrylate salt formed substantially from acrylic acid monomer via polyacrylic acid having a weight average molecular weight of 2,000 or from mixtures of the two materials. When mixtures of polyacrylic acid salt and naphthalene sulfonic acid salt-formaldehyde condensate were used in varying proportions, the total amount of additives were considered as the dosage level. The samples containing one additive were used as comparative samples.

Figure 2:
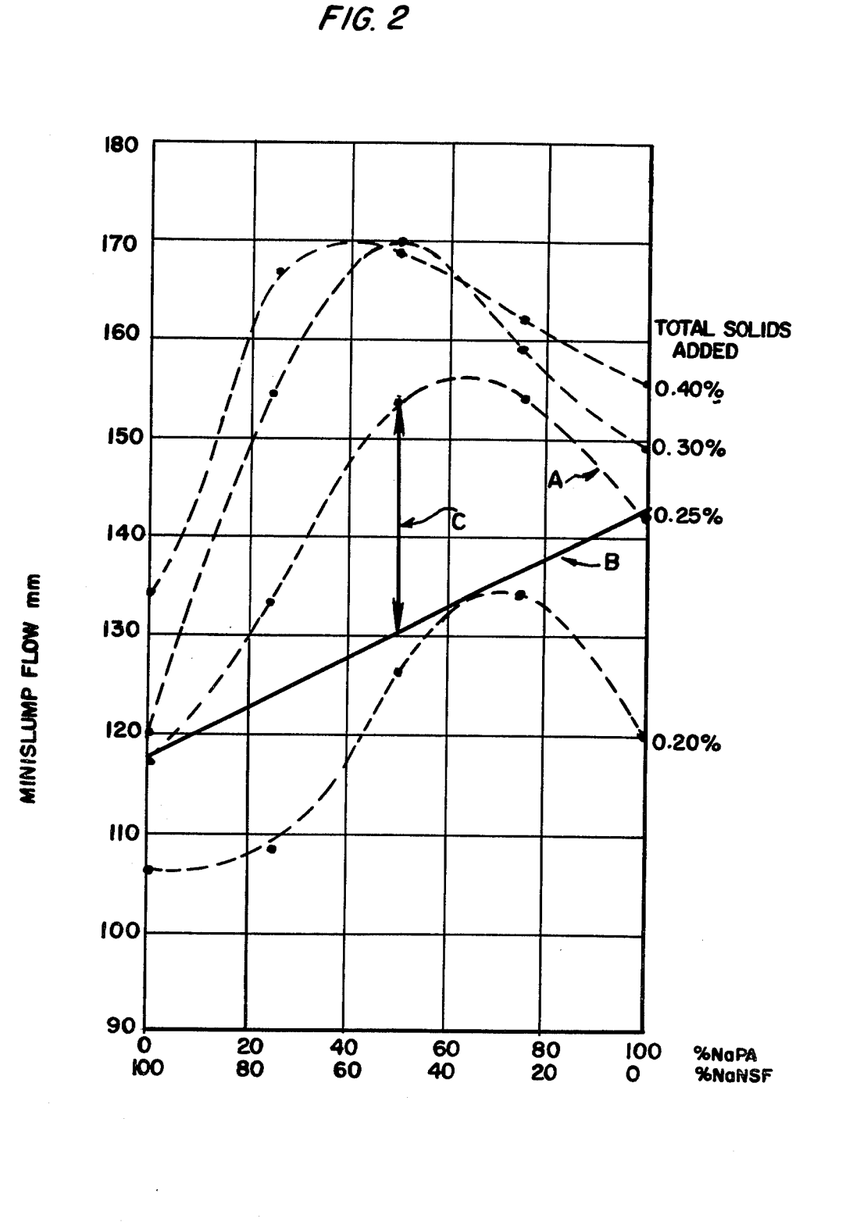
Figure 3:
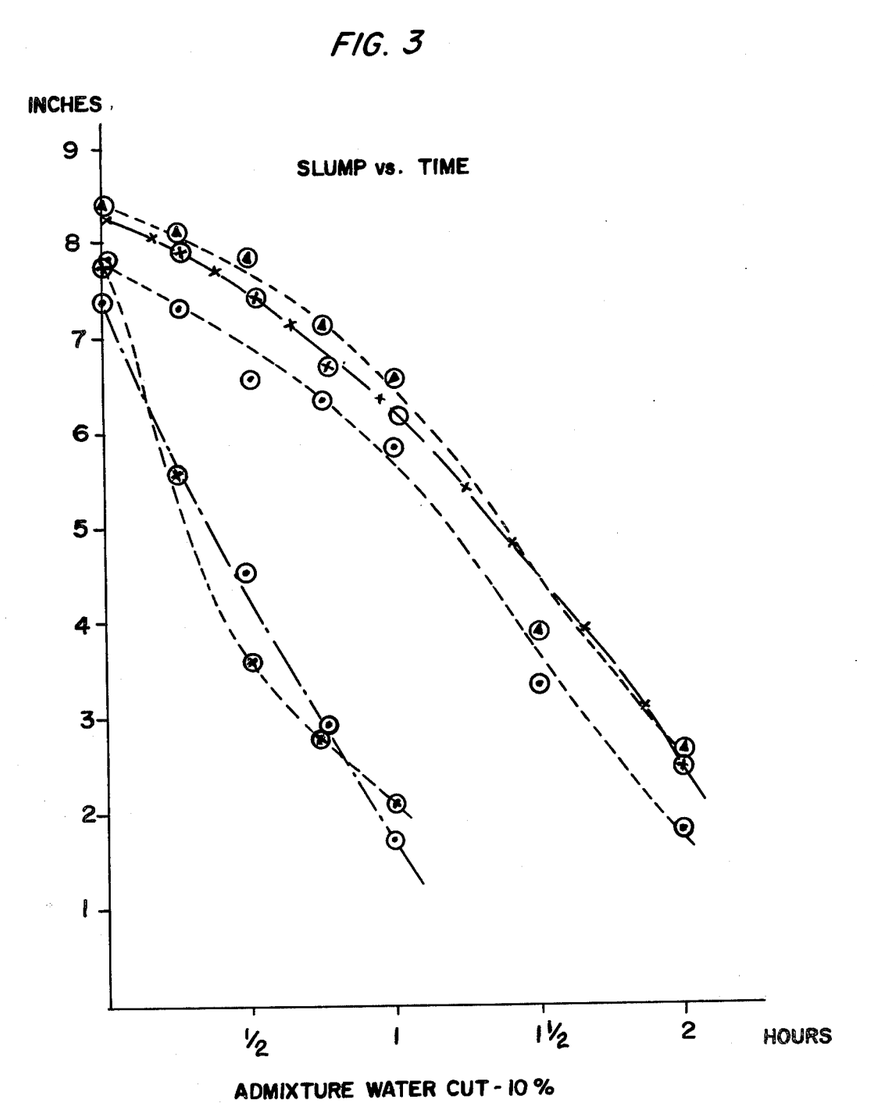

Each of the samples was measured for fluidity by a standard minislump test procedure described in Kantro, B. L., "Influence of Water-Reducing Admixtures on Properties of Cement Pastes—A Miniature Slump Test," *Cement, Concrete and Aggregates*, Vol. 2, No. 2 Winter 1980, pp. 95–102. Samples containing no additive were also tested as a standard and exhibited a minislump flow of 95 mm. The test results for the remaining samples are contained in Table I hereinbelow and are graphically depicted in FIG. 2. FIG. 2 shows that cement compositions containing sodium polyacrylate in from 10 to 95 percent with the remainder being sodium naphthalene sulfonate-formaldehyde exhibits exceptionally high degree of fluidization. For example, at 0.25 percent solid superplasticizer dosage based on total solids added, the paste showed exceptionally high flow values (curve A) over what would be expected as additive effect by drawing a straight line (curve B) between flow values for each individual component. The enhanced flow for a 0.25 percent s/s dosage is the value of distance C.

TABLE I(A)

| Solids added as percent of Total Solids | Na polyacrylate % | Na Naphthalene Sulfonate-Formaldehyde % | Minislump mm |
|---|---|---|---|
| 0.0 | — | — | 95 |
| 0.2 | 0 | 100 | 106 |
|  | 25 | 75 | 108 |
|  | 50 | 50 | 126 |
|  | 75 | 25 | 134 |
|  | 100 | 0 | 120 |

TABLE I(A)-continued

| Solids added as percent of Total Solids | Na polyacrylate % | Na Naphthalene Sulfonate-Formaldehyde % | Mini-slump mm |
|---|---|---|---|
| 0.25 | 0 | 100 | 118 |
|  | 25 | 75 | 133 |
|  | 50 | 50 | 154 |
|  | 75 | 25 | 153 |
|  | 100 | 0 | 142 |
| 0.30 | 0 | 100 | 120 |
|  | 25 | 75 | 154 |
|  | 50 | 50 | 170 |
|  | 75 | 25 | 159 |
|  | 100 | 0 | 149 |
| 0.40 | 0 | 100 | 135 |
|  | 25 | 75 | 167 |
|  | 50 | 50 | 168 |
|  | 75 | 25 | 162 |
|  | 100 | 0 | 156 |

B. A series of cement compositions were formed in the same manner as described above at 0.25 percent s/s total dosage except that the sodium polyacrylate was substituted with sodium polyacrylate of 2,000 and 5,000 molecular weight and by a copolymer formed from acrylic acid and acrylamide monomeric units. Each material was tested separately and in combination (1:1) for minislump as described above. The results are given in Table Ia below:

TABLE I(B)

| Na Polyacrylate Monomer(s) | M.W. | Individual Mini Slump mm | Na NSF | Individual Mini Slump mm | Combined (1:1) Composition Mini Slump mm |
|---|---|---|---|---|---|
| Acrylic acid | 2,000 | 142 | Na NSF | 116 | 154 |
| Acrylic acid | 5,000 | 148 | " | 116 | 148 |
| Acrylic acid/acrylamide (9.5/1) | 15,000 | 130 | " | 116 | 138 |

EXAMPLE II

Cement samples were formed in the same manner and from the same materials as described in Example I(B) above and were tested for set retardation using standard calorimeter measurements as described by G. C. Edwards and R. L. Angstadt, in J. Appl. Chem. 16,166 (1966). The results are given in Table II below.

TABLE II

| Solids Added as % of Total Solids (s/s) | % NaPA[1] | % NaNSF[2] | Time of Set (hrs.) |
|---|---|---|---|
| 0 | — | — | 8.25 |
| 0.20 | 25 | 75 | 9.0 |
|  | 50 | 50 | 9.5 |
|  | 75 | 25 | 10.5 |
| 0.25 | 20 | 80 | 8.75 |
| 0.30 | 33 | 66 | 9.5 |

TABLE II-continued

| Solids Added as % of Total Solids (s/s) | % NaPA[1] | % NaNSF[2] | Time of Set (hrs.) |
|---|---|---|---|
|  | 50 | 50 | 11.25 |
| 0.40 | 25 | 75 | 9.75 |

[1]NaPA = sodium polyacrylate $MW_w$ = 2000
[2]NaNSF = sodium naphthalene sulfonate-formaldehyde It is seen that each of the samples tested exhibited acceptable set time in relation compared to the blank inserted here for comparison.

EXAMPLE III

Standard slump tests (ASTM C-143) were performed on concrete samples formed from a mixture of 4000 parts Type II portland cement, 6000 parts sand, 11,000 parts aggregate (5/8 and 1¼ inch 50:50 mix) and 2000 parts water (0.5 w/c ratio) for blank or 1,700 parts water (0.425 w/c ratio) for samples with admixtures. The samples were formed by initially mixing the dry solids and then adding water and, where appropriate, after a slump test, adding a superplasticizer admixture. The samples included blank concrete (no admixture), concrete containing only 0.2 percent s/s sodium polyacrylate salt or 0.2 percent s/s sodium naphthalene sulfonate-formaldehyde as used in Example I above (as comparative samples) and concrete containing 0.2 percent s/s of a 50:50 mixture of sodium polyacrylate and sodium naphthalene sulfonate-formaldehyde. The results shown in Table III below verify that the combination is an extremely good cement superplasticizer for concrete compositions and achieves unexpectedly higher slump than would be assumed achievable by additive effects of the combination of components.

TABLE III

| Proportions at 0.2% s/s total | | | Slump at Elapsed Time (inches) | | | | | | | |
|---|---|---|---|---|---|---|---|---|---|---|
| NaPA[1] | NaNSF[2] | NaL[3] | Blank | Dosed | 15 | 30 | 45 | 60 | 90 | 120 |
| 0 | 1.0 | 0 | 2.25 | 7.5 | 5 | 3 | 2.5 | 2.25 | 1.25 | — |
| 0 | 0 | 1.0 | 2 | 7.5 | 6.75 | 4.75 | 2.75 | 1.75 | 1.25 | — |
| 0.5 | 0.5 | 0 | 2.25 | 8.5 | 8 | 7 | 6.5 | 5.5 | 5 | 3 |
| 0.33 | 0.33 | 0.33 | 2 | 8 | 7.5 | 6 | 6 | 5.5 | 3.25 | 2.25 |
| 0.17 | 0.42 | 0.42 | 2 | 8.25 | 7 | 5.25 | 4.75 | 3 | 2.25 | 1.25 |
| 0 | 0 | 0 | 0 | 8 | 7.75 | 7.5 | 7 | 6.25 | 5.75 | — |

[1]NaPA = sodium polyacrylate ($MW_w$ = 2000)
[2]NaNSF = sodium naphthalene - sulfonate-formaldehyde of broad mol. wt. distribution
[3]NaL = sodium lignin sulfonate (Zewapulver)

EXAMPLE IV

Cement paste compositions having a water to cement ratio of 0.45 were formed and tested by minislump tests as described in Example I above. Samples were formed of a blank cement paste (no admixture); a cement paste to which 0.25 percent s/s of a sodium lignin sulfonate (Lignosol SFX of Reed Ltd.) or 0.25 percent s/s sodium polyacrylate of weight average molecular weight of 2,000 was added with the water; and a cement paste with 0.25 percent s/s total dosage of a combination (50:50) of each of the above two materials added with the water. Samples were also examined for set time by calorimetric method as described in Example II above. Results are given in Table IV below.

TABLE IV

| Admixture % s/s | | Minislump | Set Time |
|---|---|---|---|
| Lignin | NaPAA | mm | Hrs. |
| — | — | 95 | 8.5 |
| 0.25 | — | 98 | 10.5 |
| 0.125 | 0.125 | 144 | 13.5 |
| — | 0.25 | 142 | 14.75 |

The calculated additive minislump of a 50:50 mixture at 0.25 percent s/s total dosage would be 120 mm. The observed value of 144 mm is substantially greater. This increased fluidity plus observed extended time of fluidity and reduced set time over the acrylate illustrates that the combination forms a highly desired superplasticizer admixture.

EXAMPLE V

A series of samples of cement compositions in the form of cement pastes were formed using a commercial Type II portland cement (Whitehall). The sodium polyacrylate was formed from polyacrylic acid homopolymer of acrylic acid with a molecular weight of 2,000, the sodium naphthalene sulfonate-formaldehyde was a commercial product (Daxad 19) and the sodium lignin sulfonate was a commercial product (Zewapulver). The water was initially mixed with the dry cement and the admixture materials were added as an aqueous solution, in ratios indicated in Table V below, to the wet cement paste approximately 9 minutes after addition of the water. The water/cement ratio was 0.45. The minislump flow was tested at 0.5 hour intervals after addition of the admixture material(s). Comparative samples containing only one admixture component or without an admixture (w/c ratio was 0.5) or with a combination of lignin sulfonate and naphthalene sulfonate were also prepared.

TABLE V

MINISLUMP

| Proportion @ Addition Rate 0.125% s/s | | | Flow at Time | | | |
|---|---|---|---|---|---|---|
| Sample No. | NaPA | NaNSF | NaL | 0 hr. | ½ hr. | 1 hr. | 1½ hr. |
| 1 | 1.0 | | | 138 | 130 | 124 | 120 |
| 2 | | 1.0 | | 124 | 101 | — | — |
| 3 | | | 1.0 | 122 | 102 | — | — |
| 4 | | 0.5 | 0.5 | 126 | 106 | — | — |
| 5 | 0.5 | 0.5 | | 146 | 121 | 120 | 121 |
| 6 | 0.5 | | 0.5 | 139 | 122 | 114 | 108 |
| 7 | 0.33 | 0.33 | 0.33 | 140 | 119 | 111 | 106 |
| 8 | 0.17 | 0.67 | 0.17 | 126 | 114 | 104 | — |
| 9 | 0.17 | 0.42 | 0.42 | 129 | 112 | 106 | — |
| 10 | 0.17 | 0.17 | 0.67 | 135 | 114 | 107 | — |
| 11 | Blank | | | 129 | 142 | 127 | 122 |

The results obtained show that the use of a single component admixture of sodium naphthalene sulfonate-formaldehyde or of sodium lignin sulfonate accelerates the rate of decrease in fluidity with time. These samples had attained a strength ($S_2$ of FIG. 1) where they were substantially nonflowable in less than 1 hour. Combinations of sodium naphthalene sulfonate-formaldehyde and sodium lignin sulfonate also exhibited this accelerated decrease in fluidity. The sample containing only sodium polyacrylate showed good fluidity over the time of the test but the set time for the sample was severely retarded. The combinations of components forming the present admixtures (samples 5 to 10) imparted all of the desired properties of initial increase in slump over that expected from its components, retention of fluidity over extended time and acceptable set time.

EXAMPLE VI

The procedure described in Example V above was repeated except that the dosages of each of the admixtures (and thereby their components) was increased to a total dosage level of 0.20 percent s/s. The results are shown in Table VI. These results confirm that the present superplasticizer admixtures (Samples 5–10) impart unexpected and improved results to cement compositions. The flow values for comparative samples 2–4 are much lower than those for samples 5–10 at 1 hour and 1.5 hour time intervals. Sample 1, although showing good flow, had undesirable set times.

TABLE VI

FLOW PROPERTIES OF POLYACRYLATE-LIGNIN-NAPHTHALENE SULFONATE COMBINATIONS

MINISLUMP

| Proportions @ Addition Rate 0.2% s/s | | | Flow (mm) at Time | | | |
|---|---|---|---|---|---|---|
| Sample No. | NaPA | NaNSF | NaL | 0 hr. | ½ hr. | 1 hr. | 1½ hr. |
| 1 | 1.0 | | | 144 | 148 | 142 | 138 |
| 2 | | 1.0 | | 149 | 122 | 112 | 104 |
| 3 | | | 1.0 | 144 | 120 | 110 | — |
| 4 | | 0.5 | 0.5 | 152 | 132 | 119 | 109 |
| 5 | 0.5 | 0.5 | | 150 | 142 | 132 | 125 |
| 6 | 0.5 | | 0.5 | 191 | 151 | 140 | 131 |
| 7 | 0.33 | 0.33 | 0.33 | 174 | 150 | 130 | — |
| 8 | 0.17 | 0.67 | 0.17 | 156 | 154 | 141 | 132 |
| 9 | 0.17 | 0.42 | 0.42 | 155 | 140 | 128 | 122 |
| 10 | 0.17 | 0.17 | 0.67 | 181 | 144 | 132 | 122 |
| 11 | Blank | | | 125 | 122 | 127 | 122 |

EXAMPLE VII

Cement mortars were formed from 2000 parts Type II portland cement (Whitehall), 4500 parts sand having no large aggregate particles and 900 parts water (w/c ratio=0.45). Samples were formed by adding, with the water forming the wet mortar, the admixture components and compositions as listed in Table V above in amounts indicated for a total dosage of 0.125% s/s and also at double quantities for a total dosage of 0.25% s/s. Samples 5 to 10 represent samples containing admixtures of the present invention. Time to attain initial set strength ($S_3$ of FIG. 1) ($T_i$) and final set strength ($S_4$ of FIG. 1) ($T_f$) was determined by Proctor test (ASTM C 403) except that initial sieving was eliminated due to the absence of large particles of aggregate. Final set was also done calorimetrically as described above. The results are given in Table VII below. These results show that acceptable set times are achieved with compositions containing the superplasticizer admixtures of the present invention similar to those attainable with commercial superplasticizer admixtures.

TABLE VII

| Sample No. | Proportions Sodium Polyacrylate[1] | NaNS-F[2] | NaL[3] | Calorimeter Set Time (hours) Total Dose 0.25% s/s | 0.125% s/s | Proctor Set Time (Ti/Tf, hours) Total Dose 0.25% s/s | 0.125% s/s |
|---|---|---|---|---|---|---|---|
| 1 | 1 | | | 17.8 | 11.0 | 11/24 | 7.5/9.3 |
| 2 | | 1 | | 9.5 | 8.5 | 4.6/610 | 4.2/5.7 |
| 3 | | | 1 | 12.0 | 8.5 | 6.5/8.5 | 5.9/7.2 |
| 4 | | 0.5 | 0.5 | 10.5 | 8.5 | 5.2/7.0 | 4.7/6.2 |
| 5 | 0.5 | 0.5 | | 11.2 | 9.3 | 6.5/8.1 | 5.0/6.7 |
| 6 | 0.5 | | 0.5 | 14.5 | | 8.6/10.3 | 6.4/7.9 |
| 7 | 0.333 | 0.333 | 0.333 | 11.2 | 9.5 | 6.4/8.0 | 5.0/6.2 |
| 8 | 0.167 | 0.667 | 0.167 | 9.2 | 8.0 | 5.4/6.9 | 4.8/6.0 |
| 9 | 0.167 | 0.417 | 0.417 | 9.8 | 8.5/9.0 | 6.2/7.8 | 5.2/6.5 |
| 10 | 0.167 | 0.167 | 0.666 | 11.2 | 10.0 | 6.5/8.0 | 5.2/6.5 |
| 11 | Blank | | | 8.5 | 8.5 | 4.3/5.7 | 4.1/5.6 |

[1] M.W. = 2,000
[2] NaNS-F = Sodium naphthalene sulfonate-formaldehyde
[3] NaL = sodium lignin sulfonate (Zewapulver)

EXAMPLE VIII

Concrete samples were prepared from 4000 parts Type I portland cement (Martin Marietta), 6000 parts sand, 11,000 parts aggregate (⅜ to 1¼ inch size) and water to form a water to cement ratio of 0.45. Additional samples were made with a 10 percent water cut but with 0.2 percent s/s dosage of commercial naphthalene sulfonate-formaldehyde superplasticizer and a commercial sodium lignin sulfonate (Zewapulver) for comparative purposes or with superplasticizer admixtures of the present invention, each at a total dosage of 0.2 percent s/s. The admixtures were added to each sample at approximately ten minutes after formation.

Each sample was tested for slump upon formation and at intervals thereafter. The samples containing admixture were tested for slump prior to and upon addition of the admixture. The results are shown in Table VIII below.

TABLE VIII

SLUMP LOSS OF CONCRETE CONTAINING ADMIXTURES AT 0.2% s/s

| NaPA | NaNSF | NaL | Before Addition | After Addition | SLUMP AT ELAPSED TIME (inches) 15 min. | 30 min. | 45 min. | 60 min. | 90 min. | 120 min. |
|---|---|---|---|---|---|---|---|---|---|---|
| — | 1.0 | — | 2 | 7¾ | 5½ | 3½ | 2¾ | 2 | 1¼ | — |
| — | — | 1.0 | 2 | 7½ | 5¾ | 4¼ | 2¾ | 1¾ | — | — |
| 0.5 | 0.5 | — | 2 | 8¼ | 8 | 7½ | 6¾ | 6¼ | 6¼ | 2¼ |
| 0.5 | — | 0.5 | 2¼ | 8¼ | 8¼ | 7¾ | 7¼ | 6¾ | 5 | 3¾ |
| 0.33 | 0.33 | 0.33 | 2¼ | 8¼ | 8 | 7¾ | 7 | 6¼ | 3¾ | 2¼ |
| 0.17 | 0.67 | 0.17 | 2¼ | 8½ | 7 | 5¼ | 4¼ | 2¾ | 1¾ | — |
| 0.17 | 0.42 | 0.42 | 2¼ | 8¾ | 7½ | 6¼ | 6 | 4½ | 2¾ | 1¼ |
| 0.17 | 0.17 | 0.67 | 2¼ | 8 | 7 | 6¼ | 4¼ | 3¼ | 2¼ | — |
| 0.0 | 0.0 | 0.0 | — | 7¾ | 7¼ | 6½ | 6¼ | 5¼ | 3¼ | 1¼ |

The results show that initial slump or fluidity was greater (even with 10 percent less water content) for each of the concrete samples containing the present admixtures and equal to or better than commercial sodium naphthalene sulfonate superplasticizer or commercial sodium lignin sulfonate water reducer. Further, the retention of fluidity is much greater for concretes containing compositions of the present invention than obtainable via the commercial products. FIG. III graphically compares loss of slump (decrease in fluidity) of samples having no admixture (curve 1), of samples having commercial superplasticizer of 0.2 percent s/s sodium naphthalene sulfonate-formaldehyde (curve 2); of samples having 0.2 percent s/s total of commercial sodium lignin sulfonate (curve 3); of samples having 0.33/0.33/0.33 ratio at 0.2 percent s/s of each of the three components (curve 4) and samples having 50:50 sodium polyacrylate/sodium naphthalene sulfonate-formaldehyde (curve 5). FIG. III clearly shows that all samples had substantially the same initial slump even though samples of curves 4 and 5 contained 10 percent less water. Samples of curves 2 and 3 lose fluidity more rapidly than the blank of curve 1 while samples of curves 4 and 5 retain essentially the same or greater fluidity compared to the blank sample (curve 1).

What is claimed is:

1. A cement superplasticizer composition comprising from 5 to 95 percent by weight of an alkali metal polyacrylate having a weight average molecular weight of from 500 to 25,000 in combination with from 5 to 95 percent by weight of (a) an alkali or alkaline earth metal polynaphthalene sulfonate-formaldehyde condensate or (b) a mixture in any proportion of an alkali or alkaline earth metal polynaphthalene sulfonate-formaldehyde and an alkali or alkaline earth metal lignin sulfonate.

2. The superplasticizer of claim 1 comprising from 5 to 95 percent by weight of an alkali metal polyacrylate and, correspondingly, from 95 to 5 percent by weight of an alkali or alkaline earth metal naphthalene sulfonate-formaldehyde.

3. The superplasticizer of claim 1 comprising from 5 to 95 percent by weight of the alkali metal polyacrylate having a weight average molecular weight of from 1,000 to 10,000 with a combination of an alkali or alkaline earth metal naphthalene sulfonate-formaldehyde condensation product and an alkali or alkaline earth metal lignin sulfonate in a weight ratio of 99.9:0.1 to 0.1:99.9.

4. The superplasticizer of claim 3, wherein the polyacrylate is present in from 15 to 85 percent by weight; the napthalene sulfonate-formaldehyde and lignin sulfonate are in a weight ratio of from 90:10 to 10:90; the polyacrylate is formed from a homopolymer from acrylic acid or methacrylic acid or copolymers of acrylic acid and methacrylic acid.

5. The superplasticizer of claim 1, wherein the polyacrylate has a general formula:

wherein R represents hydrogen or methyl; M represents an alkali metal; $R^1$ represents a $C_1$–$C_3$ alkoxy or amide group; x and y are integers of 1 or greater; z is an integer including zero; the ratio of z to the sum $x+y+z$ is less than 0.3; and the sum of $x+y+z$ represents a polymer having a molecular weight of from 500 to 25,000.

6. The superplasticizer of claim 2, wherein the polyacrylate has a general formula:

wherein R represents hydrogen or methyl; M represents an alkali metal; $R^1$ represents a $C_1$–$C_3$ alkoxy or amide group; x and y are integers of 1 or greater; z is an integer including zero; the ratio of z to the sum $x+y+z$ is less than 0.3; and the sum of $x+y+z$ represents a polymer having a molecular weight of from 500 to 25,000.

7. The superplasticizer of claim 3, wherein the polyacrylate has a general formula:

wherein R represents hydrogen or methyl; M represents an alkali metal; $R^1$ represents a $C_1$–$C_3$ alkoxy or amide group; x and y are integers of 1 or greater; z is an integer including zero; the ratio of z to the sum $z+y+z$ is less than 0.3; and the sum of $x+y+z$ represents a polymer having a molecular weight of from 500 to 25,000.

8. The superplasticizer of claim 7 wherein M is sodium; z is zero; and the sum of $x+y$ represents a polymer of weight average molecular weight of from 1,000 to 10,000.

9. In a cement composition formed from a silicate based cement and having a superplasticizer therein, the improvement comprising that said superplasticizer is defined by claims 1, 2, 3, 4, 5, 6 or 7 and is present in said cement composition in from 0.05 to 2 percent solid superplasticizer based on total solids of the cement composition.

10. The composition of claim 9 wherein the cement composition is a concrete formed from a silicate based cement sand, aggregate and water and the superplasticizer is present in from 0.1 to 0.5 percent s/s.

11. A method of forming a cement structure comprising mixing a cement composition having a silicate-based cement base with water and with from 0.05 to 2 percent s/s of a superplasticizer composition of claims 1, 2, 3, 4, 5, 6 or 7 to cause the superplasticizer and the hydraulic cement therein to interact and impart fluidity to said cement composition; forming said fluidized cement composition into a desired shape; and curing said cement composition.

12. The method of claim 11 wherein the cement composition is concrete formed from a silicate based cement sand, aggregate and water and the superplasticizer is present in from 0.1 to 0.5 percent s/s.

13. A method of forming a cement structure comprising mixing a silicate based cement composition with water and with from 0.05 to 2 percent s/s of a superplasticizer composition consisting essentially of from 5 to 95 percent by weight of an alkali metal acrylate of a weight average molecular weight of from 500 to 25,000 and from 95 to 5 percent by weight, respectively, of an alkali or alkaline earth metal lignin sulfonate.

14. The method of claim 13 wherein the cement composition contains a silicate based cement, sand, aggregate and water and the superplasticizer is present in from 0.1 to 0.5 percent s/s.

15. A cement composition formed according to the method of claim 13.

16. A cement composition formed according to the method of claim 14.

* * * * *